United States Patent [19]

Ridley

[11] 4,125,157
[45] Nov. 14, 1978

[54] REMOVING SULFUR DIOXIDE FROM GAS STREAMS WITH RETORTED OIL SHALE

[75] Inventor: Richard D. Ridley, Grand Junction, Colo.

[73] Assignee: Occidental Oil Shale, Inc., Grand Junction, Colo.

[21] Appl. No.: 814,991

[22] Filed: Jul. 12, 1977

Related U.S. Application Data

[63] Continuation of Ser. No. 728,421, Sep. 30, 1976, abandoned, which is a continuation-in-part of Ser. No. 656,061, Feb. 6, 1976, abandoned, which is a continuation of Ser. No. 492,894, Jul. 29, 1974, abandoned.

[51] Int. Cl.² .................. E21B 43/24; E21C 41/10
[52] U.S. Cl. .................. 166/259; 166/302; 299/2; 208/11 R
[58] Field of Search ............ 166/251, 256, 259, 265, 166/266, 272, 302; 299/2; 208/11 R; 423/242, 244; 48/197 R

[56] References Cited

U.S. PATENT DOCUMENTS

| | | | |
|---|---|---|---|
| 3,072,187 | 1/1963 | Carr | 166/258 |
| 3,086,853 | 4/1963 | Brandberg | 48/197 R |
| 3,454,958 | 7/1969 | Parker | 166/256 |
| 3,548,938 | 12/1970 | Parker | 166/256 |
| 3,551,093 | 12/1970 | Myers et al. | 423/244 |
| 3,578,080 | 5/1971 | Closmann | 166/259 X |
| 3,661,423 | 5/1972 | Garret | 299/2 |
| 3,969,089 | 7/1976 | Moss et al. | 48/197 R |
| 4,005,752 | 2/1977 | Cha | 299/2 X |
| 4,014,575 | 3/1977 | French et al. | 166/256 X |

*Primary Examiner*—Stephen J. Novosad
*Assistant Examiner*—George A. Suchfield
*Attorney, Agent, or Firm*—Christie, Parker & Hale

[57] ABSTRACT

Sulfur dioxide is removed from a gas stream by passing the gas through retorted oil shale particles containing alkaline earth metal oxides.

12 Claims, 1 Drawing Figure

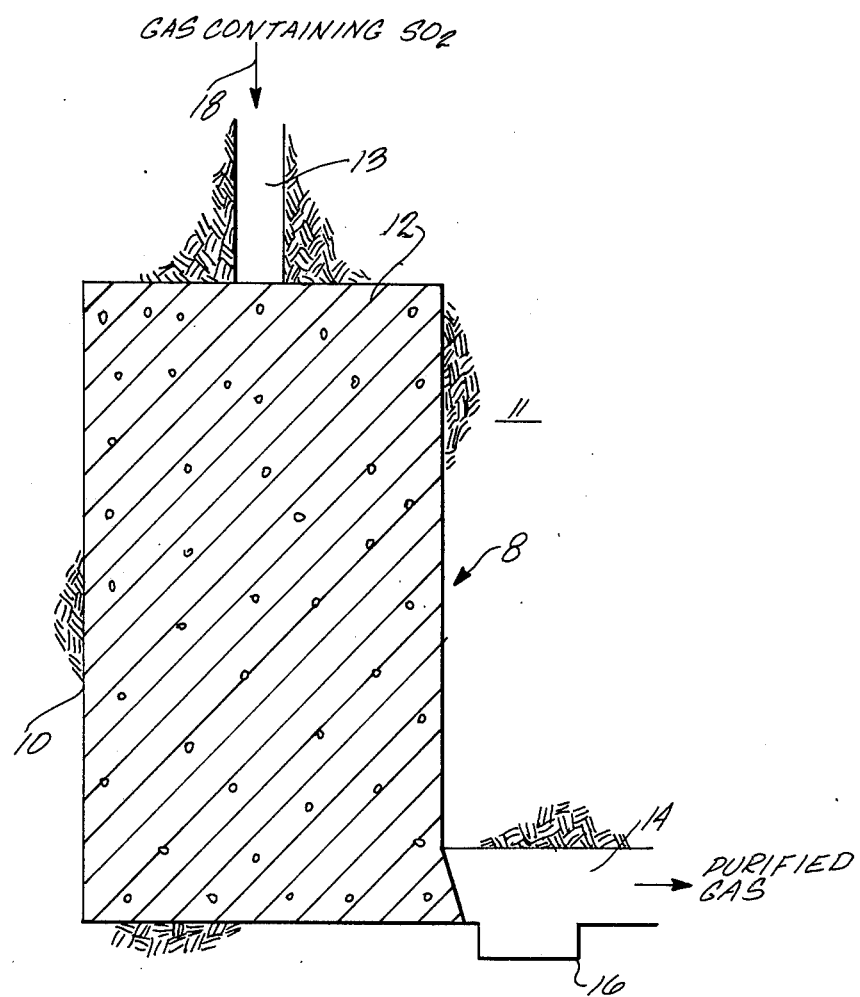

REMOVING SULFUR DIOXIDE FROM GAS STREAMS WITH RETORTED OIL SHALE

CROSS-REFERENCES

This application is a continuation of application Ser. No. 728,421, filed Sept. 30, 1976, now abandoned; which is a continuation-in-part of application Ser. No. 656,061, filed Feb. 6, 1976, now abandoned; which is a continuation of application Ser. No. 492,894, filed on July 29, 1974, which is now abandoned. The subject matter of these applications is hereby incorporated by reference.

BACKGROUND OF THE INVENTION

The presence of large deposits of oil shale in the Rocky Mountain region of the United States has given rise to extensive efforts to develop methods of recovering shale oil from kerogen in the oil shale deposits. A number of known methods have been developed for processing the oil shale which involve either first mining the kerogen bearing shale and processing the shale on the surface, or processing the shale in situ. The latter approach is preferable from the standpoint of environmental impact since the spent shale remains in place, reducing the chance of surface contamination and the requirement for disposal of solid wastes.

The recovery of liquid and gaseous products from oil shale deposits has been described in several issued patents, one of which is U.S. Pat. No. 3,661,423, issued May 9, 1972 to Donald E. Garrett and assigned to the assignee of this application. This patent describes the in situ recovery of liquid and gaseous carbonaceous materials from subterranean oil shale deposits by fragmenting oil shale in a subterranean oil shale deposit to form a stationary body of fragmented oil shale within the deposit, referred to herein as an in situ oil shale retort. Hot retorting gases are passed through the in situ oil shale retort to convert kerogen contained in the oil shale to liquid and gaseous products.

One method of supplying the hot retorting gases used for converting kerogen contained in the oil shale, as described in the '423 patent, includes the establishment of a combustion zone in the retort and the movement of an oxygen supplying gaseous feed mixture downwardly into the combustion zone to advance the combustion zone downwardly through the retort. In the combustion zone oxygen in the gaseous feed mixture is depleted by reaction with hot carbonaceous materials to produce heat and a combustion gas. By the continued introduction of the oxygen supplying gaseous feed mixture downwardly into the combustion zone, the combustion zone is advanced downwardly through the retort.

The combustion gas and the portion of the gaseous feed mixture which does not take part in the combustion process pass through the retort on the advancing side of the combustion zone to heat the oil shale in a retorting zone to a temperature sufficient to produce kerogen decomposition, called retorting, in the oil shale to gaseous and liquid products and a residue product of solid carbonaceous material.

The liquid products and gaseous products are cooled by the cooler oil shale fragments in the retort on the advancing side of the retorting zone. The liquid carbonaceous products, together with water formed during combustion, are collected at the bottom of the retort. An off gas containing combustion gases generated in the combustion zone, product gas produced in the retorting zone, gas from carbonate decomposition, and gaseous feed mixture which does not take part in the combustion process is also collected at the bottom of the retort.

The off gas, which contains nitrogen, hydrogen, carbon monoxide, carbon dioxide, water vapor, methane and other hydrocarbons, and sulfur compounds such as hydrogen sulfide, can be used as a fuel or otherwise disposed of but should first be purged of the sulfur compounds. The sulfur compounds in the off gas are generated from naturally occurring sulfur compounds in oil shale during the heating and combustion in the in situ oil shale retort. Unless removed, the sulfur compounds are oxidized to form sulfur dioxide when the off gas is oxidized. Sulfur dioxide is a pollutant and can combine with water vapor in the off gas to form $H_2SO_3$ and other polythionic acids which are toxic and corrosive.

While various processes for the removal of sulfur dioxide from gases such as off gas from oil shale retorting have been devised, most such known processes involve contacting the gas with an absorbing agent to convert the sulfur dioxide to a removable liquid or solid. The spent absorbing agent must then either be chemically regenerated or disposed of and replaced. Various absorption agents have been used, such as alkali metal carbonates, but the regeneration rate of these agents is low and the initial cost of many of these agents is too large to permit discharging of the spent agent. Water and limestone have been used as throwaway agents. Water systems have the disadvantage that they require cooling and heating of large quantities of gas and the resulting acidity of the water represents a disposal problem. Lime and limestone have been used as absorbents in both dry systems and wet systems. Since sulfur dioxide reacts more readily with lime, which is calcium oxide, than with limestone, which is principally calcium carbonate, calcination of the limestone is usually used. However, the reaction rate is still prohibitively low at reasonable temperatures so the gas is heated to temperatures above 1000° F. to be effective. A large excess of lime or limestone is required because the resulting calcium sulfite forms on the particle surfaces, thereby quickly reducing the reaction rate with the coated lime or limestone particles.

Thus, there is a need for an economical process for removing sulfur dioxide from the off gas from an in situ oil shale retort.

SUMMARY OF THE INVENTION

The present invention is directed towards a method for removing sulfur dioxide from gas streams by passing the gas through a fragmented permeable mass of retorted oil shale particles containing alkaline earth oxides at a sufficient temperature to remove sulfur dioxide from the gas. This method is useful for removing sulfur dioxide from off gas from oil shale retorting.

More specifically, sulfur dioxide is removed from a gas stream by passing the gas stream through an in situ oil shale retort in a subterranean formation containing oil shale. The in situ retort contains a fragmented permeable mass of formation particles containing retorted oil shale. The retorted oil shale results from introducing a gaseous feed containing an oxygen supplying gas into a combustion zone advancing through the in situ retort to advance the combustion zone and produce combustion product gases. The combustion product gases and any unreacted portion of the gaseous combustion zone feed are passed through the fragmented mass of particles on the advancing side of the combustion zone to retort oil shale and to establish a retorting zone on the advancing side of the combustion zone. Liquid and gaseous products are produced in the retorting zone. The liquid products and a retort off gas containing gaseous products, combustion product gases, gas from carbonate decomposition and any unreacted portion of the gaseous combustion zone feed are withdrawn from the in situ oil shale retort.

Preferably the retorted oil shale particles contain a stoichiometric excess of alkaline earth metal oxides relative to the sulfur dioxide in the gas stream when the gas is passed through the fragmented mass of particles to permit quick removal of the sulfur dioxide from the gas and to insure that a high proportion of the sulfur dioxide is removed from the gas.

Preferably at least a portion of the fragmented mass of retorted oil shale particles has a temperature greater than about 500° F., and more preferably greater than about 1000° F. when the gas is passed through the fragmented mass of particles because higher temperatures permit quicker and more complete removal of the sulfur dioxide and/or treatment of larger quantities of gas. Since retorted oil shale particles can have a residual temperature in excess of 500° F. from retorting, it is preferred that the gas be passed through the fragmented mass of retorted oil shale before all of the retorted oil shale cools below the preferred temperature.

These and other features, aspects and advantages of the present invention will become more apparent with the following description of the invention, accompanying drawing, and appended claims.

DRAWING

The accompanying drawing schematically represents in vertical cross-section an in situ oil shale retort containing retorted oil shale being used for removing sulfur dioxide from a gas stream.

DESCRIPTION

Referring to the drawing, an inactive in situ oil shale retort 8 is in the form of a cavity 10 formed in an unfragmented subterranean formation 11 containing oil shale. The cavity is filled with a body or pile of an expanded and fragmented permeable mass 12 of formation particles. The cavity 10 can be created simultaneously with fragmentation of the mass of formation particles 12 by blasting by any of a variety of techniques. A method of forming an in situ oil retort is described in U.S. Pat. No. 3,661,423.

A conduit 13 communicates with the top of the fragmented mass of formation particles. During the retorting operation of the retort 8, a combustion zone is established in the retort and advanced by introducing a gaseous feed containing an oxygen supplying gas, such as air or air mixed with other gases, into the in situ oil shale retort through the conduit 13. As the gaseous feed is introduced to the retort, oxygen oxidizes carbonaceous material in the oil shale to produce combustion product gases including sulfur compounds. Heat from the exothermic oxidation reactions carried by flowing gases advances the combustion zone through the fragmented mass of particles.

It will be understood that although the "oxygen supplying gas" is ordinarily ambient air, other composition variations are included within the term. Thus, for example, if desired, air can be augmented with additional oxygen so that the partial pressure of oxygen is increased. Similarly, air can be diluted with recycled off gas produced during retorting operation or other gases free of free oxygen to reduce the partial pressure of oxygen. Such recycling is, for example, practiced for reducing the oxygen concentration of the gas introduced into the retort to about 14% instead of the 20% in air.

Combustion product gases produced in the combustion zone and any unreacted portion of the gaseous combustion zone feed are passed through the fragmented mass of particles on the advancing side of the combustion zone to establish a retorting zone on the advancing side of the combustion zone. Kerogen in the oil shale is retorted in the retorting zone to liquid and gaseous products. Some gaseous sulfur compounds can also be derived from reactions in the retorting zone.

There is a tunnel 14 in communication with the bottom of the retort. The tunnel contains a sump 16 in which liquid products are collected to be withdrawn for further processing. An off gas containing gaseous products, combustion product gases, gases from carbonate decomposition, and any unreacted portion of the gaseous combustion zone feed is also withdrawn from the in situ oil shale retort 8 by way of the tunnel 14. The off gas can contain large amounts of nitrogen with lesser amounts of hydrogen, carbon monoxide, carbon dioxide, methane, higher hydrocarbons, water vapor, and sulfur compounds such as hydrogen sulfide. It is desirable to remove the sulfur compounds from the off gas so the off gas can be used directly as fuel gas for power generation in a work engine such as a gas turbine.

At the end of a retorting operation spent oil shale in the retort 8 is at an elevated temperature which can be in excess of 1000° F. The hottest region of the retort typically is near the bottom, and a somewhat cooler region is at the top due to continual cooling by gaseous combustion zone feed during retorting and conduction of heat to adjacent shale.

Oil shale contains large quantities of alkaline earth metal carbonates, principally calcium and magnesium carbonates, which during retorting are calcined to produce alkaline earth metal oxides. Thus spent retorted oil shale particles contain approximately 20 to 30% calcium oxide and 5 to 10% magnesium oxide, with smaller quantities of less reactive oxides present.

When it is desired to remove the sulfur compounds from the off gas from an active in situ retort, the off gas can be partially or totally oxidized to assure that sulfur compounds are oxidized to sulfur dioxide.

Referring to the drawing, a gas stream 18 containing sulfur dioxide such as oxidized off gas from an active oil shale retort is passed through a conduit 13 to the retort 8. The gas is under sufficient differential pressure to cause it to flow downwardly through the conduit 13 which is in communication with the upper boundary of the retorted oil shale particles in the inactive retort 8 and downwardly through the retort 8 to be withdrawn from the retort through the tunnel 14 which is in communication with the bottom of the retort. For economy, the conduit used for introducing combustion zone feed to the retort 8 when it is active is utilized for introducing the sulfur dioxide containing gas 18 into the retort. Similarly, the tunnel used for withdrawing products from the retort 8 when the retort is active is utilized to withdraw the purified gas from the retort.

As the gas passes through the retort, sulfur dioxide present in the gas reacts with the oxides of calcium and magnesium to form calcium and magnesium sulfites according to the reaction:

$$MO + SO_2 \rightarrow MSO_3$$

where M represents an alkaline earth metal.

While the direct reaction between sulfur dioxide and calcium or magnesium oxide to form the sulfite occurs to a negligible extent at ambient temperature, at temperatures above 1000° F., reaction occurs quickly. The heat for increasing input gas temperature is at least partly obtained from the sensible heat remaining in the spent shale retort. At temperatures from 500° F. to 1000° F. the reaction proceeds to completion, but slower. Thus, the reaction continues at lower rates until the temperature of the fragmented mass of retorted shale drops too low to provide adequate removal of the sulfur dioxide. At temperatures below 450° F. to 500° F., the flow rate of the gas may be too great to achieve adequate removal of sulfur dioxide in a single retort. The gas can be passed through additional retorts in series and/or parallel containing retorted oil shale or recirculated several times in a single retort to achieve maximum removal.

Preferably there is a stoichiometric excess of alkaline earth metal oxides in the retorted oil shale particles in the retort 8 relative to the sulfur dioxide in the gas stream 18 when the gas is passed through the retort. However, as the retorted oil shale particles in the retort are used to remove sulfur dioxide from the gas stream, the amount of alkaline earth metal oxides available for removing sulfur dioxide decreases. In addition, calcium sulfite precipitates on the surface of the oil shale particles and reduces the efficiency of sulfur dioxide removal. When this occurs it may be necessary to pass the gas through additional in situ retorts containing retorted oil shale or recirculate the gas several times through a single retort to achieve adequate removal of sulfur dioxide. When there is no longer a stoichiometric excess of alkaline earth metal oxides relative to the amount of sulfur dioxide in the gas being passed through the retort, the gas should be diverted to another retort containing retorted oil shale particles.

Generally, sufficient alkaline earth metal oxides are present in a retort to remove sulfur dioxide from gas generated from retorting oil shale in a retort of comparable size. For example, retorting one ton of oil shale particles can yield 1000 lbs. of alkaline earth metal oxides and 18,000 standard cubic feet of off gas containing up to 0.17% by weight of sulfur compounds. Thus for each mole of sulfur compounds produced in a retort, there are available over 400 moles of alkaline earth metal oxides in the retorted oil shale to remove sulfur dioxide from off gas. Thus when removing sulfur dioxide from off gas generated during oil shale retorting, there is a large stoichiometric excess of alkaline earth metal oxides available. Therefore, the presence of calcium sulfite precipitates on the surfaces of the oil shale particles has a limited effect on removal of sulfur dioxide and at least the major part of the sulfur dioxide in oxidized off gas from an active in situ retort can be removed with retorted oil shale particles.

The method of this invention has many advantages over prior art processes described above. By utilizing retorted oil shale the purchase of an absorbent such as lime or limestone is avoided. The cost of calcining limestone and grinding and injecting absorbent into the gas stream also is avoided. Furthermore, retorted shale used as an absorbent remains in the ground, thereby eliminating any disposal problem. In addition, because there is a large stoichiometric excess of retorted oil shale available, regeneration of retorted oil shale used as an absorbent is unnecessary, and a long residence time of the sulfur dioxide containing gas stream in the retort can be utilized. This permits operation at lower gas temperatures than are presently practiced in commercial processes. For the same reason, a surface coating of sulfites on the retorted oil shale particles has minimal effect on removal of sulfur dioxide. Another advantage of the method of the invention is that by utilizing the sensible heat of retorted oil shale, which otherwise might not be used, heating of the gas prior to removing sulfur dioxide is avoided.

Although the invention has been described in considerable detail with reference to certain versions thereof, other versions of the invention are possible. For example, although in the drawing a gas stream containing sulfur dioxide is shown as passing downwardly through the in situ retort 8 containing retorted oil shale, off gas can also be passed upwardly from the bottom of an in situ retort containing retorted oil shale. Because of variations such as this, the spirit and scope of the appended claims should not necessarily be limited to the description of the versions contained herein.

What is claimed is:

1. A method for removing sulfur dioxide from a gas stream comprising the step of passing the gas through an in situ oil shale retort containing a fragmented permeable mass of retorted oil shale particles containing alkaline earth metal oxides at a sufficient temperature to remove sulfur dioxide from the gas.

2. The method of claim 1 wherein the fragmented mass of retorted oil shale particles has a stoichiometric excess of alkaline earth metal oxides relative to the sulfur dioxide in the gas when the gas is passed therethrough.

3. The method of claim 1 wherein at least a portion of the fragmented mass of retorted oil shale particles has a temperature greater than about 1000° F. when the gas is passed therethrough.

4. The method of claim 1 wherein at least a portion of the fragmented mass of retorted oil shale particles has a temperature of from about 500° F. to about 1000° F. when the gas is passed therethrough.

5. The method of claim 1 wherein at least a portion of the fragmented mass of retorted oil shale particles has a residual temperature in excess of about 500° F. from retorting when the gas is passed therethrough.

6. A method for removing sulfur dioxide from gas from oil shale retorting comprising the step of:
passing the gas through an in situ oil shale retort containing a fragmented permeable mass of retorted oil shale particles containing alkaline earth metal oxides at a sufficient temperature to remove sulfur dioxide from the gas.

7. The method of claim 6 wherein at least a portion of the fragmented mass of retorted oil shale particles has a temperature of from about 500° F. to about 1000° F. when the gas is passed therethrough.

8. The method of claim 6 wherein at least a portion of the fragmented mass of retorted oil shale particles has a residual temperature in excess of about 500° F. from retorting when the gas is passed therethrough.

9. The method of claim 6 wherein the fragmented mass of retorted oil shale particles has a stoichiometric excess of alkaline earth metal oxides relative to the sulfur dioxide in the gas when the gas is passed therethrough.

10. The method of claim 6 wherein at least a portion of the fragmented mass of retorted oil shale particles has a temperature greater than about 1000° F. when the gas is passed therethrough.

11. A method for removing sulfur dioxide from gas from oil shale retorting comprising the step of passing the gas through an in situ oil shale retort containing a fragmented permeable mass of retorted oil shale particles at a temperature greater than about 500° F. and containing a stoichiometric excess of alkaline earth metal oxides relative to the sulfur dioxide in the gas when the gas is passed therethrough.

12. A method for removing sulfur dioxide from a gas comprising the steps of:

(a) forming an in situ oil shale retort in a subterranean formation containing oil shale, said in situ retort containing a fragmented permeable mass of formation particles containing oil shale and alkaline earth metal carbonates;

(b) introducing a gaseous combustion zone feed comprising an oxygen supplying gas into a combustion zone advancing through the retort for advancing the combustion zone through the fragmented mass of particles and producing combustion product gases and converting alkaline earth metal carbonates to corresponding alkaline earth metal oxides;

(c) passing combustion product gases and any unreacted portion of the gaseous combustion zone feed through the fragmented mass of particles on the advancing side of the combustion zone for retorting oil shale on the advancing side of the combustion zone wherein liquid and gaseous products and retorted oil shale are produced; and (d) contacting retorted formation particles containing alkaline earth metal oxides in the in situ retort with a gas containing sulfur dioxide while the retorted formation particles are at a sufficient temperature to remove sulfur dioxide from the gas.

* * * * *